United States Patent
Husson (10) Patent No.: US 8,056,911 B2
(45) Date of Patent: Nov. 15, 2011

(54) COMPOUND STEERING MECHANISM

(75) Inventor: Geoffroy Husson, Ceintrey (FR)

(73) Assignee: AGCO SA, Beauvais (FR)

( * ) Notice: Subject to any disclaimer, the term of this patent is extended or adjusted under 35 U.S.C. 154(b) by 0 days.

(21) Appl. No.: 12/745,675

(22) PCT Filed: Nov. 13, 2008

(86) PCT No.: PCT/EP2008/009602
§ 371 (c)(1),
(2), (4) Date: Jun. 1, 2010

(87) PCT Pub. No.: WO2009/074204
PCT Pub. Date: Jun. 18, 2009

(65) Prior Publication Data
US 2010/0301575 A1    Dec. 2, 2010

(30) Foreign Application Priority Data
Dec. 11, 2007 (GB) .................................. 0725398.2

(51) Int. Cl.
*B60G 7/00* (2006.01)
(52) U.S. Cl. ......... 280/93.502; 280/93.504; 280/93.506; 280/93.511; 280/93.512; 280/137.501
(58) Field of Classification Search ............ 280/93.502, 280/93.504, 93.506, 93.51, 93.511, 93.512, 280/137.501, 137.5
See application file for complete search history.

(56) References Cited

U.S. PATENT DOCUMENTS

| | | | | |
|---|---|---|---|---|
| 3,765,698 A * | 10/1973 | Burrell | ..................... | 280/124.17 |
| 5,046,577 A * | 9/1991 | Hurlburt | ........................ | 180/266 |
| 5,297,648 A * | 3/1994 | Hansen et al. | ................. | 180/424 |
| 5,312,123 A * | 5/1994 | Hurlburt | ................... | 280/93.503 |
| 5,322,309 A * | 6/1994 | Hurlburt | ................ | 280/124.113 |
| 5,769,180 A * | 6/1998 | Momose et al. | ............. | 180/424 |
| 7,125,027 B2 * | 10/2006 | Sap et al. | ............... | 280/124.114 |
| 7,467,683 B2 * | 12/2008 | Malvestio | ..................... | 180/266 |
| 7,758,058 B2 * | 7/2010 | Bordini | .................. | 280/137.501 |

FOREIGN PATENT DOCUMENTS

| | | |
|---|---|---|
| GB | 2392657 A | 3/2004 |
| WO | WO-98/47756 A | 10/1998 |

OTHER PUBLICATIONS
International Search Report for PCT/EP2008/009602 dated Feb. 23, 2009.

* cited by examiner

*Primary Examiner* — Toan To (57) ABSTRACT

In summary, there is provided a front axle mounting assembly (100) which is suitable for a tractor or a construction vehicle for example. The assembly comprises a steerable front axle (130), which is typically the front axle on a tractor, and a pair of support arms (120) which extend forwardly from the main body of the vehicle. The arms are pivotally mounted to the body of the vehicle, for example, at the front of the chassis, at transversely spaced mounting points (121). The other ends of the arms (120) are pivotally attached to, and maintained at a fixed spacing, by a crosslink member (124). The axle (130) is mounted to the crosslink member (124) so as to be parallel thereto when viewed from above. By mounting the axle (130) on two support arms (120) instead of one, the effective radius of pivot of the axle is significantly increased, thereby allowing the axle to move sideways to a greater extent for a given angular displacement.

20 Claims, 9 Drawing Sheets

COMPOUND STEERING MECHANISM

TECHNICAL FIELD

The invention relates to an axle mounting assembly suitable for an agricultural vehicle, and particularly to an assembly having a steerable axle which moves laterally relative to the frame of the vehicle.

BACKGROUND

A vehicle having a large radius of turn is known to have a more limited ability to manoeuvre. This is a particular problem in agricultural vehicles such as tractors where there is often a need to manoeuvre within areas having a restricted space. When using implements such as wide-boom sprayers on fields of crops there is also a desire to minimise the area which is flattened by the tractor whilst still covering the entire field. Having a smaller radius of turn reduces the area flattened when turning on the field headlands for example.

A conventional tractor comprises two axles mounted on a chassis. The front axle comprises steerable wheels mounted at the ends of the axle. As the general trend, farm machinery is progressively increasing in size which, in turn, has lead to an increase in the size of tractors. Larger tractors generally require larger wheels, both larger in diameter and in width. Combined with the constraints on overall tractor width, larger steerable wheels reduce the angle at which the wheels can turn without catching on the engine compartment of the tractor for example. There is, therefore, a desire to find alternatives to the conventional steering arrangement.

UK patent application GB-2,392,657, the content of which is incorporated herein by reference, discloses a compound steering mechanism wherein the axle pivots laterally relative to the chassis. Two plan views of the arrangement from GB-2,392,657 are replicated herein as FIGS. 1 and 2. The same reference numbers will be used for the sake of simplicity.

Figure 1:
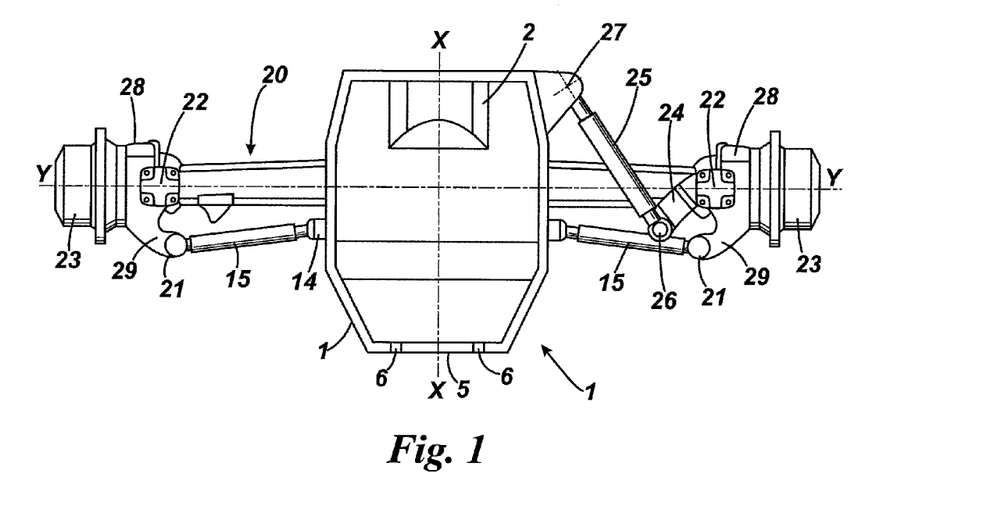
FIG. 1 is a plan view of a known compound steering assembly.

An axle 20 is connected to an axle support 1 through a link (not shown) which extends upwardly from a ball-and-socket joint on the axle 20 to a ball-and-socket joint on the support 1. The rear part of the axle 20 is connected to the support through a further ball-and-socket joint allowing the axle to pivot in an arc about this joint. With reference to FIG. 1, wheel hubs 23 are steered by means of a steering ram 14 and track rods 15 attached to respective brackets 21. A connecting link 25 is attached to the support 1 forward of the axle, and to a bracket 24 connected to a steerable hub 23.

Figure 2:
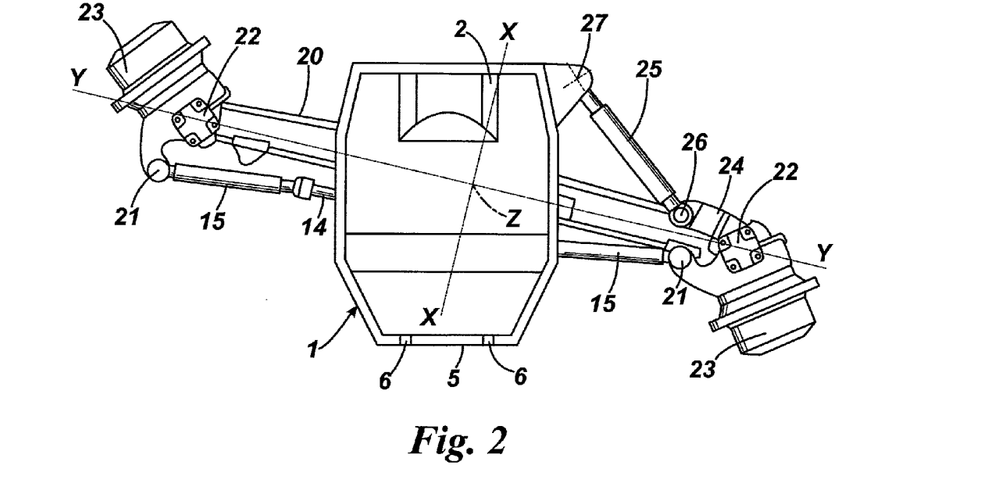
FIG. 2 is a plan view of the compound steering assembly of FIG. 1, with the steering wheels turned through an angle.

The connecting link 25 causes the axle 20 to pivot relative to the support 1 in response to operation of the steering ram 14, as shown in FIG. 2, such that the axis Y-Y of the axle moves from being substantially perpendicular to the longitudinal axis to being angularly displaced with respect to the longitudinal axis. By moving the axle relative to the chassis, the turning angle can be increased.

SUMMARY

It is an object of the present invention to provide an improved mechanism for displacing the axle relative to the chassis.

In accordance with the invention there is provided a front axle mounting assembly for a tractor comprising a steerable front axle having steerable wheel hubs mounted to each respective end thereof, a pair of support arms each extending forwardly from, and having a first end being pivotally mounted to, an axle support at respective transversely spaced mounting points, and second ends being pivotally attached to, and maintained at a fixed spacing by, a crosslink member, the axle being mounted to the crosslink member so as to be parallel thereto when viewed from above. By mounting the axle on two support arms, the effective radius of pivot of the axle is significantly increased, thereby allowing the axle to move sideways to a greater extent for a given angular displacement.

It has been found that the maximum angle to which an axle can pivot is inhibited when the arc of pivot has a relatively small radius, such as that described in GB-2,392,657. The problem associated with vehicles having large steerable wheels on conventional steering systems can manifest itself in that any angular displacement of the axle brings the wheel on the inside of the turning circle closer to the vehicle frame. The invention includes, inter alia, the recognition that a larger radius arc of pivot is desired to provide greater transverse displacement of the axle when steering the vehicle. Such sideways movement of the axle increases the distance between the inner edge of the steered wheel and the frame of the vehicle thereby allowing full exploitation of the benefits of pivoting the axle.

The twin support arms, linked by the crosslink member, provide a means for pivotally displacing the axle about a point which is located significantly further back on the vehicle than any pivot point which can be practically delivered using a single support member for the axle.

Preferably, the assembly further comprises axle sluing means pivotally attached at a first end thereof to a point fixed relative to the axle and spaced from said second ends of the support arms, a second end of the axle sluing means being pivotally attached to the assembly at a point which is moveable relative to the axle, wherein the axle is caused to slue sideways by the axle sluing means changing the distance between the first and second ends thereof. By changing the distance between the two connection points of the axle sluing means, the geometry of the various assembly members dictates that the axle is forced sideways by a pivoting motion of the two support arms. In one embodiment the second end of the axle sluing means is attached to one of the supporting arms.

In a preferred embodiment, the assembly further comprises steering means which serves to steer the wheel hubs, wherein each wheel hub is mounted to an end of the axle by respective pins which turn relative to the axle in accordance with a force applied by the steering means, one pin being fixably connected to the first end of the axle sluing means. In this arrangement, the axle sluing means operates in response to the steering means such that the axle is shifted sideways in cooperation with a steering action. Advantageously, this provides an integrated compound steering mechanism which angularly and transversely displaces the axle in proportion to the angular displacement of the wheels. The steering means preferably comprises a dual-acting hydraulic ram which acts upon brackets which are attached to each of the pins, or king pins, causing them to rotate and cause the distance between the first and second ends of the axle sluing means to vary in length. The dual-acting hydraulic ram is preferably fixably mounted relative to the axle.

In another embodiment the axle sluing means comprises a dual acting ram. This may optionally and additionally serve as the steering ram wherein the ram acts upon a vertical pin attached to one of the wheel hubs.

In still another preferred embodiment, the axle sluing means comprises first and second struts pivotally connected to one another. In this arrangement, the distance between the respective ends of the sluing means is simply changed in a mechanical manner in accordance with the angle between the two connected struts.

In an alternative arrangement the axle is mounted to the crosslink member by suspension means which allows the axle to pivot in a plane which is generally vertical and parallel to the axle.

Preferably, the axle support is the chassis of a vehicle.

The axle mounting assembly according to the invention can be employed on any vehicle. However, the arrangement is particularly advantageous on vehicles which require a small turning circle and especially on those vehicles having large steerable wheels such as agricultural, construction and utility vehicles. The invention is particularly suited to tractors.

In a further embodiment the assembly is fitted to a tractor and further comprises a front linkage arrangement for attaching an agricultural implement, the linkage arrangement being mounted on the crosslink. Advantageously, the linkage assembly shifts sideways together with the axle.

BRIEF DESCRIPTION OF THE DRAWINGS

Further embodiments of the invention will be described by way of example with reference to the drawings, wherein.

DETAILED DESCRIPTION OF EXAMPLE EMBODIMENTS

Common reference numbers will be used for similar features and components.

Figure 3:
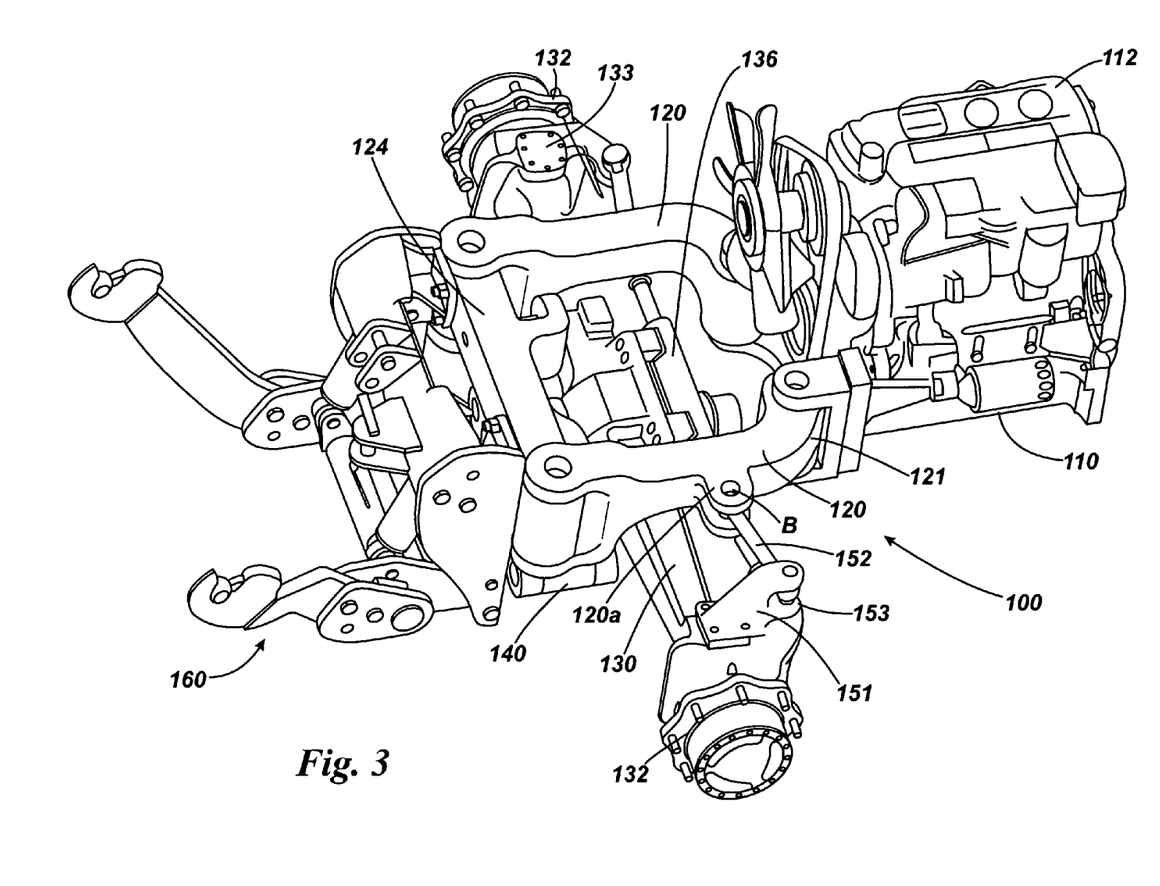
FIG. 3 is a perspective view of a axle mounting assembly in accordance with a first embodiment of the invention.
Figure 4:
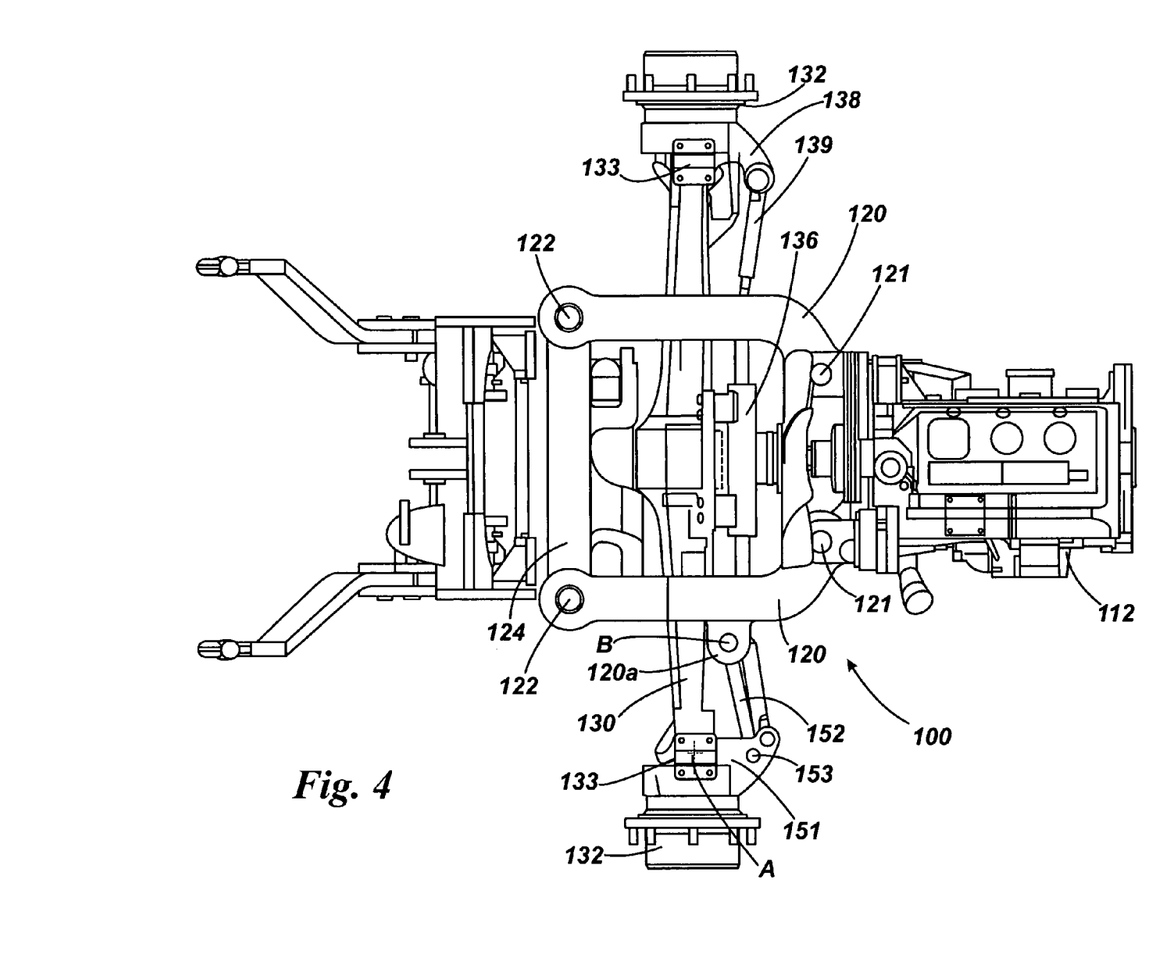
FIG. 4 is a plan view of the axle mounting assembly of FIG. 3.
Figure 5:
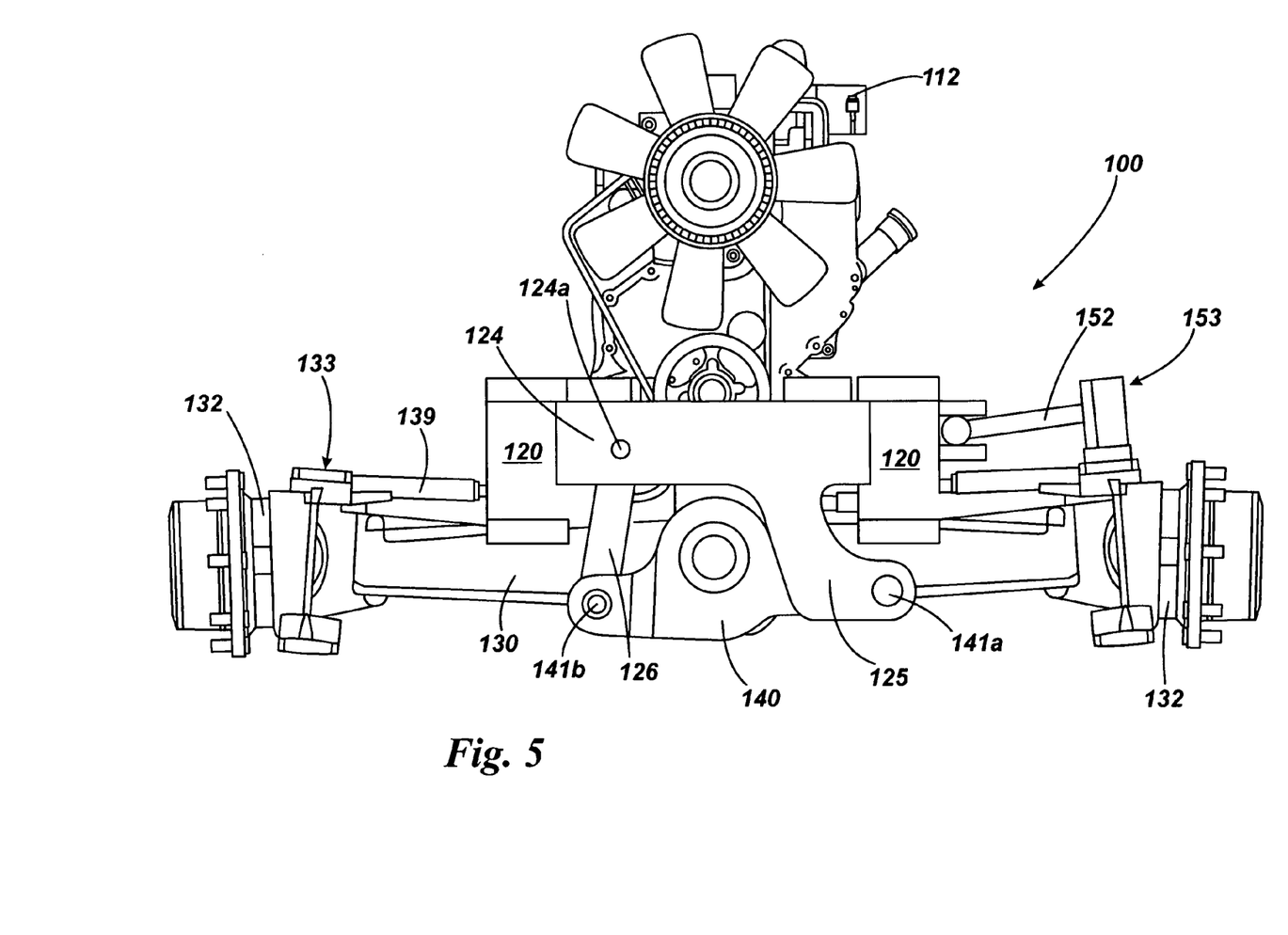
FIG. 5 is a front view of the axle mounting assembly of FIG. 3 with the front linkage not shown.

With reference to FIGS. 3, 4 and 5, a first embodiment of the invention with now be described. An axle mounting assembly 100 is fixed to the sump 110 of a tractor engine 112, the sump 110 forming part of the tractor chassis. It should be appreciated however that the assembly could instead be mounted to an engine block or rigid frame for example.

Two rigid support arms 120 are pivotally mounted to the sump 110 at respective mounting points 121. The mounting points 121 are spaced transverse to the direction of normal travel of the tractor with one mounting on the left side of the sump 110 and one mounting on the right side. Each arm 120 extends forwardly from, and are free to pivot in a generally horizontal plane about, the respective mounting point 121.

A crosslink member 124 in the form of a rigid beam is pivotally attached at each of its respective ends to the forward (second) ends of the support arms 120, referenced at 122 in FIG. 4. The crosslink member 124 maintains the second ends of the support arms 120 at a fixed separation keeping the arms substantially parallel during operation.

The axle 130 comprises an axle casing on the ends of which are mounted steerable wheel hubs 132, the hubs 132 being mounted on the axle casing by respective king pins 133. The steering means is conventional in nature and comprises a dual-acting hydraulic ram 136 attached to a central portion of the axle 130. The action of the ram 136 is controlled by the driver via a steering wheel which in communication with a hydraulic steering control unit (not shown), said unit being connected to the ram 136 by a plurality of pipes (not shown). The pistons of the ram are connected to respective levers 138 on the wheel hubs 132 by adjustable tracking rods 139. The ram 136 applies a force upon the levers 138 which causes the wheel hubs 132 to pivot about the king pins 133.

The axle 130 is mounted to the crosslink member 124 in a way that maintains the axle parallel thereto whist allowing vertical movement relative to the crosslink member. Therefore, the transverse orientation of the crosslink member 124 dictates the (steered) direction of the axle 130.

Figure 9:
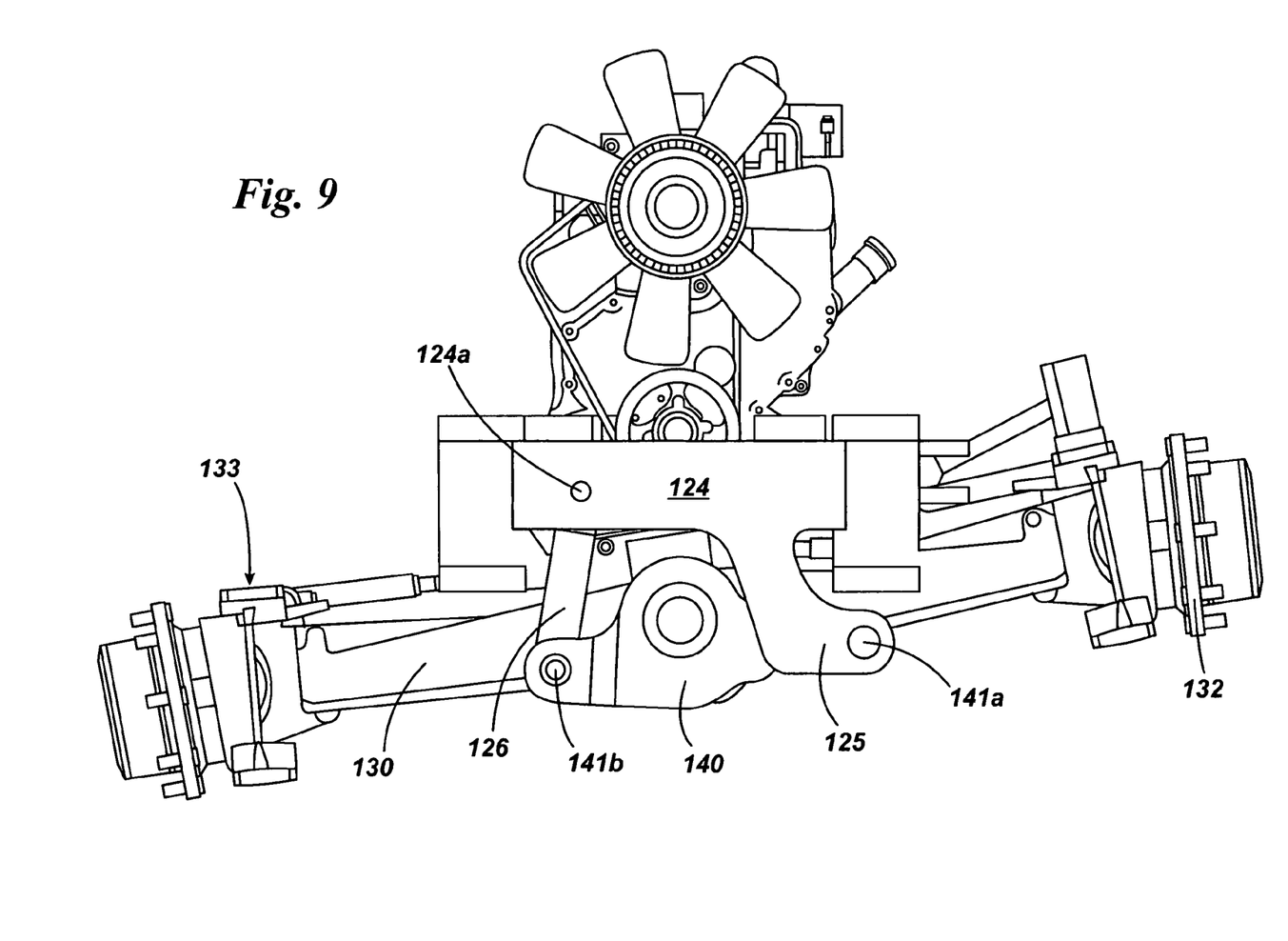
FIG. 9 is a front view of the axle mounting assembly of FIG. 3, with the axle angularly displaced in the vertical plane.

Referring to FIGS. 5 and 9 in particular, a suspension member 140 is attached to the crosslink member 124 at two attachment points 141*a*, 141*b*. A downwardly extending spur 125 of the crosslink member 124 is pivotally attached at a first transverse end 141*a* of the suspension member 140. A hydraulic dampening cylinder 126 is pivotally connected to a second transverse end 141*b* of the suspension member 140, and to the main beam of the crosslink member 124 at connection point 124*a*. As shown in FIG. 9, the suspension member 140 allows the axle 130 to pivot in a plane which is generally vertical and parallel to the axle. The suspension functionality is optional and can be locked out of use by locking the suspension member 140 relative to the crosslink member 124 using the cylinder 126. However, when the suspension member is free to pivot on its respective attachment points 141*a*, 141*b*, the axle 130 is suspended and can move up and down relative to the crosslink member 124.

Referring again to FIGS. 3 and 4, the assembly 100 further comprises means to slue, or swing, the axle 130 on the support arms 120 in a generally sideways motion in response to steering of the wheels. Sluing means comprises first and second rigid struts 151, 152 pivotally coupled to one another. The first strut 151 is attached to the top of one of the king pins 133, referenced at A in FIG. 4, and extends parallel to the diameter of the wheel hub 132 generally rearward from the turning axis A of the king pin 133. The attachment is made in a way such that the first strut 151 turns with the steered wheel hub 132. A pivoting joint 153 connects the other end of the first strut 151 to a first end of the second strut 152. The second strut 152 is pivotally coupled at a second end B to the nearest support arm 120 by a mounting bracket 120*a* which extends off of the side of the arm 120.

Figure 10:
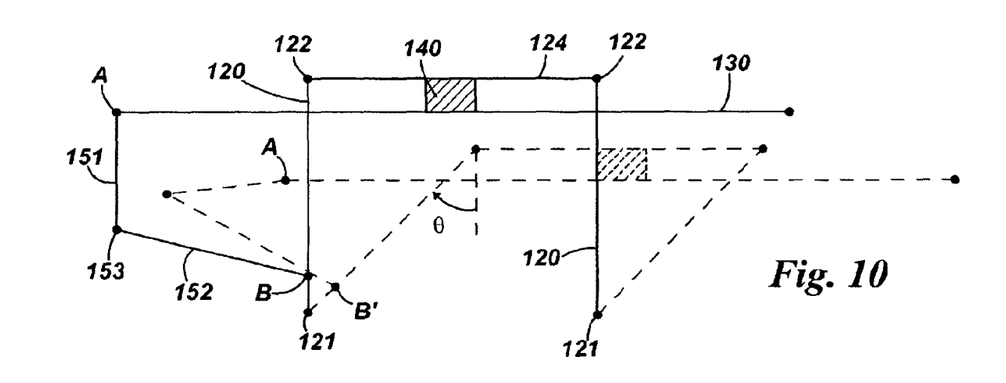
FIG. 10 is a schematic diagram which illustrates aspects of the geometry of an axle mounting assembly in accordance with a second embodiment of the invention; and, FIG. 11 is a schematic diagram which illustrates aspects of the geometry of an axle mounting assembly in accordance with a third embodiment of the invention.

Operation of the steering mechanism and the reaction of the axle sluing means thereto will now be described in simplified form with reference to FIG. 10. The solid line diagram of FIG. 10 represents the general geometry of the axle 130, suspension member 140, support arms 120, crosslink member 124 and axle sluing means 151, 152, 153 when the steering is set substantially straight, i.e. parallel to the longitudinal axis of the tractor. The dashed line diagram represents the geometry of the assembly when the steering is turned through an angle θ.

The force applied by the dual-acting steering ram 136 upon the levers 138 causes the wheel hubs to turn to the right on the king pin 133. This movement causes the first strut 151 to pivot by an angle θ as shown in FIG. 10. The second strut 152, coupled to the first strut 151 at pivot point 153, applies a reaction force on the connected arm 120 at B. This causes the support arms 120 to pivot on the crosslink member 124 at connection points 122 as the distance between A and B is reduced to that indicated by A' and B'. The effect is for the axle 130 and crosslink member 124 to slue sideways. It can be seen that an adjustment in the overall distance between the mounting points (A,B) of the first and second struts 151, 152 causes the axle 130 to shift in a generally sideways direction.

Figure 6:
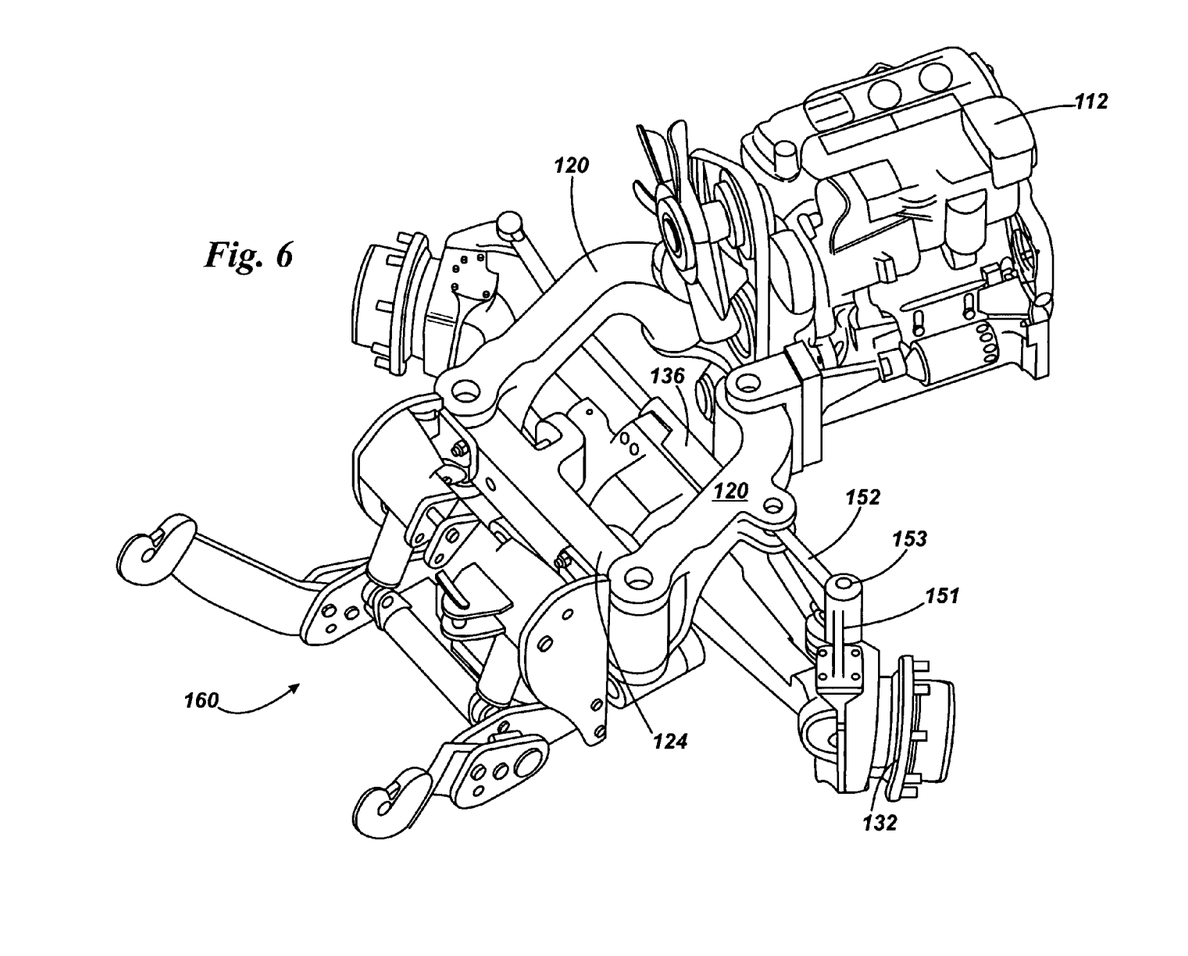
FIG. 6 is a perspective view of the axle mounting assembly of FIG. 3, with the steering wheels turned through an angle.
Figure 7:
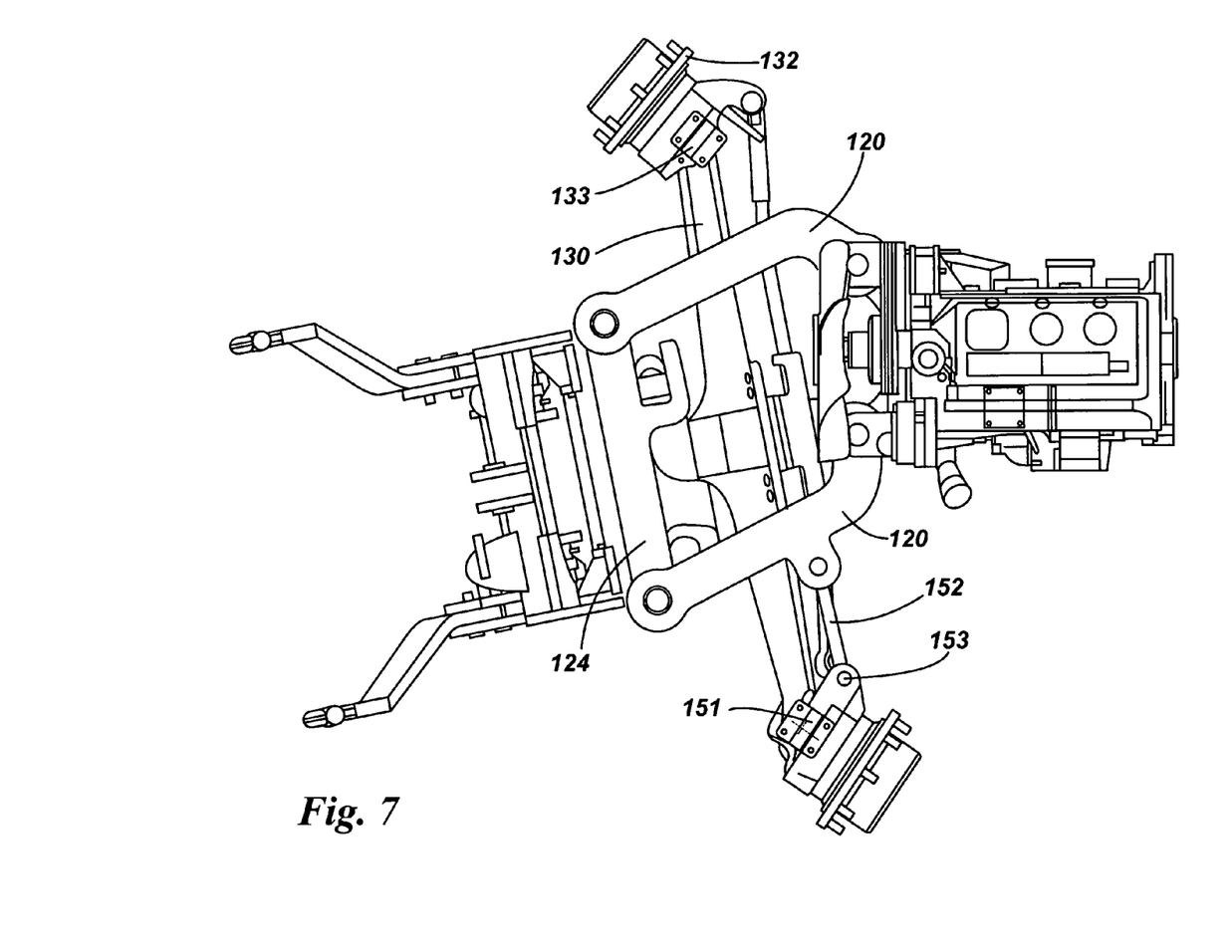
FIG. 7 is a plan view of the axle mounting assembly of FIG. 3, with the steering wheels turned through an angle.

Turning back to the first described embodiment and FIGS. 6 and 7, the advantages of the assembly in accordance with the invention become apparent. For the left-turn shown, the rear edge of the left wheel is angled towards the engine 112. However, the generally sideways motion delivered by the axle mounting assembly 100 increases the distance between the inside wheel (not shown) and the engine 112, thereby facilitating the use of larger wheels, whilst also providing a component of pivot in cooperation with the steering to reduce the radius of turn.

Figure 8:
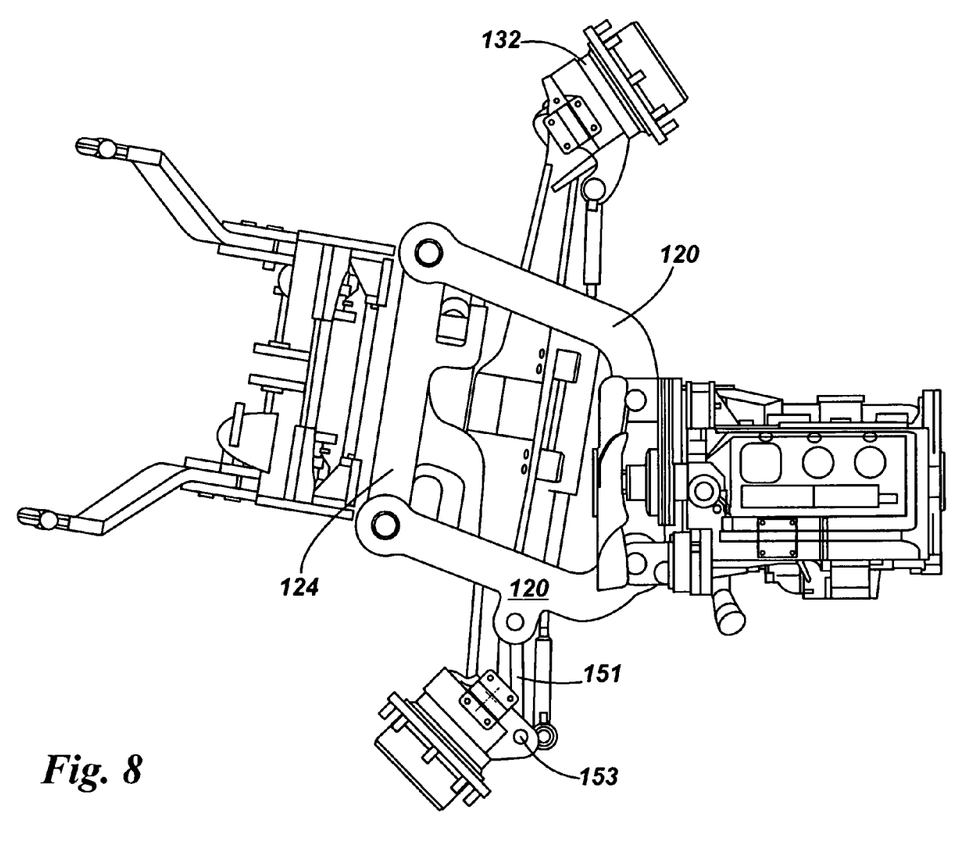
FIG. 8 is a plan view of the axle mounting assembly of FIG. 3, with the steering wheels turned through an angle in the opposite direction to that shown in FIG. 7.

FIG. 8 shows the assembly when the steering means is oriented for a right turn.

With reference to FIG. 3 for example, the assembly further comprises a front linkage arrangement 160 for attaching an agricultural implement such as a plough or weight block. The linkage arrangement 160 is conveniently mounted on the crosslink member 124. Front linkage arrangements are commonly used on agricultural vehicles and the specific arrangement of the separate components will not be described any further. By mounting the linkage arrangement to the forwardly facing beam of the crosslink member 124, the implement advantageously precedes the course of the tractor's path as the crosslink shifts sideways in response to the steering.

Figure 11:
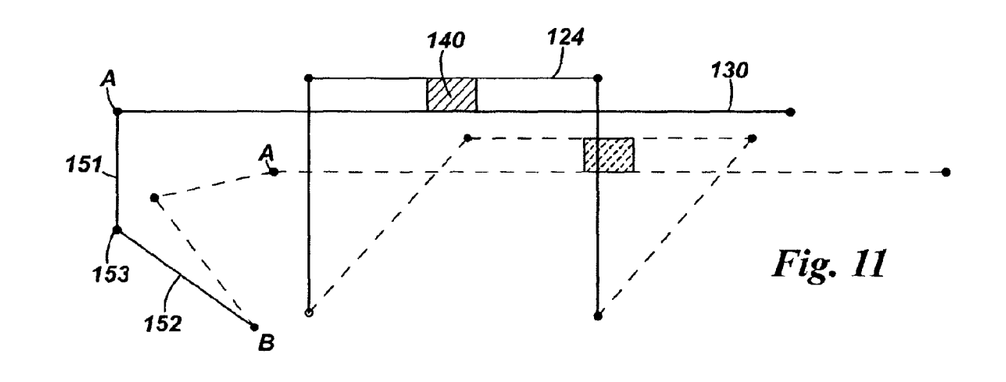

It should be appreciated that the location on the assembly upon which the two struts 151, 152 are pivotally attached can vary from that shown in the first embodiment of FIGS. 3 to 8 whilst staying within the scope of the invention. For example, as shown schematically in FIG. 11, the second strut 152 can alternatively be pivotally attached to a fixed point B on the tractor frame. In a further alternative embodiment (not shown), the first strut can be connected to a point on the central portion of the axle 130. The strut can be linked in some manner to the steering mechanism, for example, to the tracking rods 139, thus allowing the sluing means to co-act with the steering.

Furthermore, the struts can be coupled to each other in a variety of arrangements. For example, the first described embodiment, as shown in FIG. 3, has struts 151, 152 which are set at an acute angle with respect to one another when the steering is set straight. However, as shown by the schematic diagram in FIG. 10, the second described embodiment has struts 151, 152 which are set at an obtuse angle with respect to one another when the steering is set straight.

The axle sluing means preferably comprises a pair of rigid struts as described above. However, it is envisaged that a dual-acting ram could be pivotally attached at its respective ends between a point fixed relative to the axle and a point on the assembly. Referring again to the schematic diagram of FIG. 10, the ram (not shown) could be connected between points A and B. By actuation of the ram, the distance between A and B would be forced to change thereby causing the axle 130 to slue to the left or to the right.

The steering of the wheels may be co-acting with, or independent from, the axle sluing means. For example, it is envisaged that one dual-acting ram could control the steering of the wheels, and a second dual-acting ram could control the sideways movement of the axle.

In a preferred arrangement, the driver can control the relationship between the steering mechanism and the axle sluing means. An example application which would benefit from such control is seed application wherein a small radius of turn is not required when traversing the field, but is desired when turning on the headland. The driver can conveniently fix the position of the axle by deactivation of the corresponding ram for example, thus allowing accurate control of the position of the wheels on the field.

Although the above-described embodiment comprises a crosslink member 124 which is pivotally connected at end regions 122 of the support arms 120, the skilled person will appreciate that said pivotal connection 122 can instead be located at an intermediate position on the arms 120 without deviating from the scope of the invention.

In summary, there is provided an axle mounting assembly which is suitable for a tractor or a construction vehicle for example. The assembly comprises a steerable axle, which is typically the front axle on a tractor, and a pair of support arms which extend forwardly from the main body of the vehicle. The arms are pivotally mounted to the body of the vehicle, for example at the front of the chassis, at transversely spaced mounting points. The other ends of the arms are pivotally attached to, and maintained at a fixed spacing, by a crosslink member. The axle is mounted to the crosslink member so as to be parallel thereto when viewed from above. By mounting the axle on two support arms instead of one, the effective radius of pivot of the axle is significantly increased, thereby allowing the axle to move sideways to a greater extent for a given angular displacement.

Various modifications to those embodiments described above, which remain within the scope of the invention, will be apparent to the skilled person.

The invention claimed is:

1. A front axle mounting assembly for a tractor comprising a steerable front axle having steerable wheel hubs mounted to each respective end thereof, a pair of support arms each extending forwardly from, and having a first end being pivotally mounted to, an axle support at respective transversely spaced mounting points, and second ends being pivotally attached to, and maintained at a fixed spacing by, a crosslink member, the axle being mounted to the crosslink member so as to be parallel thereto when viewed from above.

2. An assembly according to claim 1, further comprising axle sluing means pivotally attached at a first end thereof to a point fixed relative to the axle and spaced from said second ends of the support arms, a second end of the axle sluing means being pivotally attached to the assembly at a point which is moveable relative to the axle, wherein the axle is caused to slue sideways by the axle sluing means changing the distance between the first and second ends thereof.

3. An assembly according to claim 2, further comprising steering means which serves to steer the wheel hubs, wherein each wheel hub is mounted to an end of the axle by respective pins which turn relative to the axle in accordance with a force applied by the steering means, one vertical pin being fixably connected to the first end of the axle sluing means.

4. An assembly according to claim 3, wherein the steering means comprises a dual-acting hydraulic ram which acts upon brackets which are attached to each of the vertical pins causing them to rotate and cause the between the first and second ends of the axle sluing means to vary in length.

5. An assembly according to claim 2, wherein the axle sluing means comprises first and second struts pivotally connected to one another.

6. An assembly according to claim 2, wherein the axle sluing means comprises a dual acting ram.

7. An assembly according to claim 4, wherein the dual-acting hydraulic ram is fixably mounted relative to the axle.

8. An assembly according to claim 2, wherein said second end of the axle sluing means is attached to one of the supporting arms.

9. An assembly according to claim 1, wherein the axle is mounted to the crosslink member by suspension means which allows the axle to pivot in a plane which is generally vertical and parallel to the axle.

10. An assembly according to claim 1, wherein the axle support is the chassis of a vehicle.

11. A tractor comprising an axle mounting assembly according to claim 1.

12. A tractor according to claim 11, further comprising a front linkage arrangement for attaching an agricultural implement, the linkage arrangement being mounted on the crosslink.

13. An assembly according to claim 3, wherein the axle sluing means comprises first and second struts pivotally connected to one another.

14. An assembly according to claim 4, wherein the axle sluing means comprises a dual acting ram.

15. An assembly according to 3, wherein said second end of the axle sluing means is attached to one of the supporting arms.

16. An assembly according to 4, wherein said second end of the axle sluing means is attached to one of the supporting arms.

17. An assembly according to 5, wherein said second end of the axle sluing means is attached to one of the supporting arms.

18. An assembly according to 6, wherein said second end of the axle sluing means is attached to one of the supporting arms.

19. An assembly according to 7, wherein said second end of the axle sluing means is attached to one of the supporting arms.

20. An assembly according to claim 2, wherein the axle is mounted to the crosslink member by suspension means which allows the axle to pivot in a plane which is generally vertical and parallel to the axle.

* * * * *